US009026185B2

(12) United States Patent
Churei

(10) Patent No.: US 9,026,185 B2
(45) Date of Patent: May 5, 2015

(54) COMMUNICATION APPARATUS, CONTROL METHOD THEREOF, AND STORAGE MEDIUM

(75) Inventor: Koji Churei, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 239 days.

(21) Appl. No.: 13/612,589

(22) Filed: Sep. 12, 2012

(65) Prior Publication Data

US 2013/0084812 A1 Apr. 4, 2013

(30) Foreign Application Priority Data

Oct. 4, 2011 (JP) ................................. 2011-220307

(51) Int. Cl.
*H04B 1/38* (2006.01)
*H04W 52/02* (2009.01)
*H04W 88/06* (2009.01)

(52) U.S. Cl.
CPC ............ *H04W 52/028* (2013.01); *H04W 88/06* (2013.01); *Y02B 60/50* (2013.01)

(58) Field of Classification Search
CPC ..... H04W 88/06; H04W 52/0209; H04B 1/44
USPC ...................... 455/73, 574, 127.1, 343.5, 41.2
See application file for complete search history.

(56) References Cited

U.S. PATENT DOCUMENTS 7,411,607 B2 8/2008 Kikugawa
8,515,500 B2 * 8/2013 Das et al. ...................... 455/574

FOREIGN PATENT DOCUMENTS

JP 2003-280778 A 10/2003
JP 2004-194220 A 7/2004

* cited by examiner

*Primary Examiner* — Tuan Pham
(74) *Attorney, Agent, or Firm* — Canon U.S.A., Inc. IP Division

(57) ABSTRACT

A communication apparatus, which is capable of communicating with a first apparatus via a first communication interface and communicating with a second apparatus via a second communication interface, determines whether the first apparatus complies with a power-saving function of the first communication interface and selects, based on a result of the determination, a communication interface to be operated when the communication apparatus is set to be in a power-saving state from between the first communication interface and the second communication interface. Depending on an ambient environment, a communication interface to be operated during a power-saving operation is selected to increase a power-saving effect.

12 Claims, 5 Drawing Sheets

COMMUNICATION APPARATUS, CONTROL METHOD THEREOF, AND STORAGE MEDIUM

BACKGROUND OF THE INVENTION

1. Field of the Invention

The present invention relates to a communication apparatus including a plurality of communication interfaces, a control method thereof, and a storage medium.

2. Description of the Related Art

In recent years, many communication apparatuses include a function (power-saving function) of setting a power-saving state for reducing power consumption. For example, there are provided Low-Power Idle (LPI) standardized by IEEE802.3az as a wired local area network (LAN) standard, and PowerSave standardized by IEEE802.11 series as a wireless LAN standard. Such communication apparatuses can continue a state connecting to a network even in the power-saving state.

Further, when the communication apparatus includes a plurality of communication interfaces, the larger number of communication interfaces are connected, the more amount of power a communication unit consumes. Thus, a control method is discussed for operating only one of the plurality of communication interfaces.

For example, according to Japanese Patent Application Laid-Open No. 2003-280778 (corresponding to U.S. Pat. No. 7,411,607), it is confirmed whether each of the plurality of communication interfaces is connected with its counter apparatus, and then only one of the communication interfaces whose connection has been confirmed is operated. Further, according to Japanese Patent Application Laid-Open No. 2004-194220, one of the plurality of communication interfaces that consumes least power for data communication is selected and operated.

However, when the communication apparatus is set to be in the power-saving state and when one communication interface is selectively operated, if the counter apparatus of the selected communication interface does not comply with the power-saving function, the communication interface cannot be set to be in the power-saving state. As a result, a power-saving effect of the communication apparatus is reduced.

SUMMARY OF THE INVENTION

The present invention is directed to, for a communication apparatus including a plurality of communication interfaces, increasing a power-saving effect by selecting a communication interface to be operated during a power-saving operation depending on an ambient environment.

According to an aspect of the present invention, a communication apparatus, which is capable of communicating with a first apparatus via a first communication interface and communicating with a second apparatus via a second communication interface, determines whether the first apparatus complies with a power-saving function of the first communication interface and selects, based on a result of the determination, a communication interface to be operated when the communication apparatus is set to be in a power-saving state from between the first communication interface and the second communication interface.

According to an exemplary embodiment of the present invention, the power-saving effect can be increased since the communication interface operated when the power is saved is selected depending on the ambient environment.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
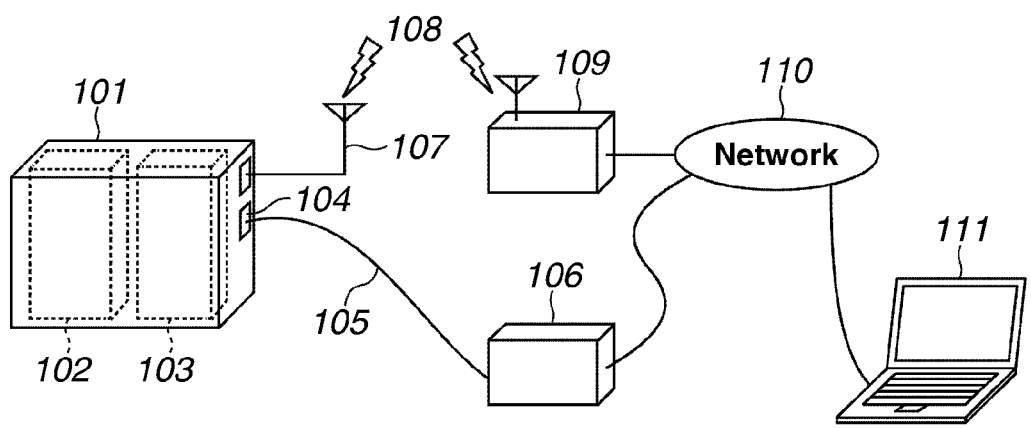
FIG. 1 illustrates a communication system according to an exemplary embodiment of the present invention.

FIG. 1 illustrates a system configuration according to a present exemplary embodiment.

A communication apparatus 101 includes a main processing unit (main system) 102 and a communication processing unit (sub system) 103. The main processing unit 102 controls the entire communication apparatus 101. For example, if the communication apparatus 101 is a printer, printing processing is performed, and if the communication apparatus 101 is a camera, imaging processing is performed. The communication processing unit 103 performs communication processing.

The communication apparatus 101 further includes a plurality of communication interfaces, and the communication processing unit 103 controls communication via each communication interface. According to the present exemplary embodiment, the communication processing unit 103 complies with two communication methods. One of the communication methods is wired communication (communication complying with IEEE802.3), and another communication method is wireless communication (communication complying with IEEE802.11 series).

The communication apparatus 101 simultaneously operates the wired communication and the wireless communication. The communication interface for the wired communication (i.e., wired interface) is a cable socket 104, and the communication interface for the wireless communication (i.e., wireless interface) is an antenna 107. The wired communication and the wireless communication complying with other standards may be used.

The cable socket 104 is directly connected to a wired connected apparatus 106 via a connection cable 105, and further connected to a network 110 via the wired connected apparatus 106. The wired connected apparatus 106 includes a hub, a router, and so on.

The antenna 107 is directly connected to a wireless connected apparatus 109 via atmosphere (wireless medium) 108, and further connected to the network 110 via the wireless connected apparatus 109. The wireless connected apparatus 109 includes an access point (base station).

According to the present exemplary embodiment, the wired connected apparatus 106 and the wireless connected apparatus 109 belong to the same network. Further, the communication apparatus 101 directly communicates with each of the above-described counter apparatuses, which are the wired connected apparatus 106 and the wireless connected apparatus 109, via each communication interface.

Another communication apparatus (herebelow refer to as an "external apparatus") 111 is connected to the wired connected apparatus 106 and the wireless connected apparatus 109 via the network 110, and can data-communicate with the communication apparatus 101. For example, if the communication apparatus 101 is a printer, the external apparatus 111 gives a print instruction to the communication apparatus 101 via the network 110 to perform print processing.

The communication apparatus 101 according to the present exemplary embodiment is operated in either state of a normal state and a power-saving state. When the communication apparatus 101 is in the normal state, power is normally supplied to each circuit block of the main processing unit 102 and the communication processing unit 103.

On the other hand, when the communication apparatus 101 is in the power-saving state, power supply to at least a part of circuits of the main processing unit 102 is stopped or reduced (voltage is lowered). At this point, the communication processing unit 103 can communicate via either communication interface of the cable socket 104 and the antenna 107.

If both the wired interface and the wireless interface are used for communication in the normal state, when a state is shifted to the power-saving state, either one of the communication interfaces is selected. The power supply is stopped or reduced for the communication interface that is not selected herein.

According to the present exemplary embodiment, one of the two communication interfaces is selected. Even when three or more communication interfaces are included, one communication interface is also selected. With this selection, since the interface to wait for the communication is narrowed down to one interface, the power-saving effect can be further increased.

The communication apparatus 101 is shifted to the power-saving state when receiving from the external apparatus 111 a power-saving state shift command via the network, or when a job to be performed by the main processing unit 102 has not been generated in a certain period of time.

When the communication processing unit 103 receives an activation packet from the external apparatus 111 via the communication interface, the communication apparatus 101 in the power-saving state shifts from the power-saving state to the normal state. More specifically, the communication apparatus 101 complies with a Wake-On-LAN (WOL) function and a Wake-On-Wireless-LAN (WOWLAN) function.

As the activation packet, MagicPacket (registered trademark) developed by Advanced Micro Devices, Inc. is used herein. MagicPacket is a packet including a special data pattern and is transmitted in broadcast mode using a user datagram protocol (UDP). A payload portion of MagicPacket includes a pattern in which a Media Access Control (MAC) address of a communication apparatus that is to be returned to the normal state is repeatedly described. As long as a signal for canceling the power-saving state of the communication apparatus is included, other packets including the signal than MagicPacket may be used.

Figure 2:
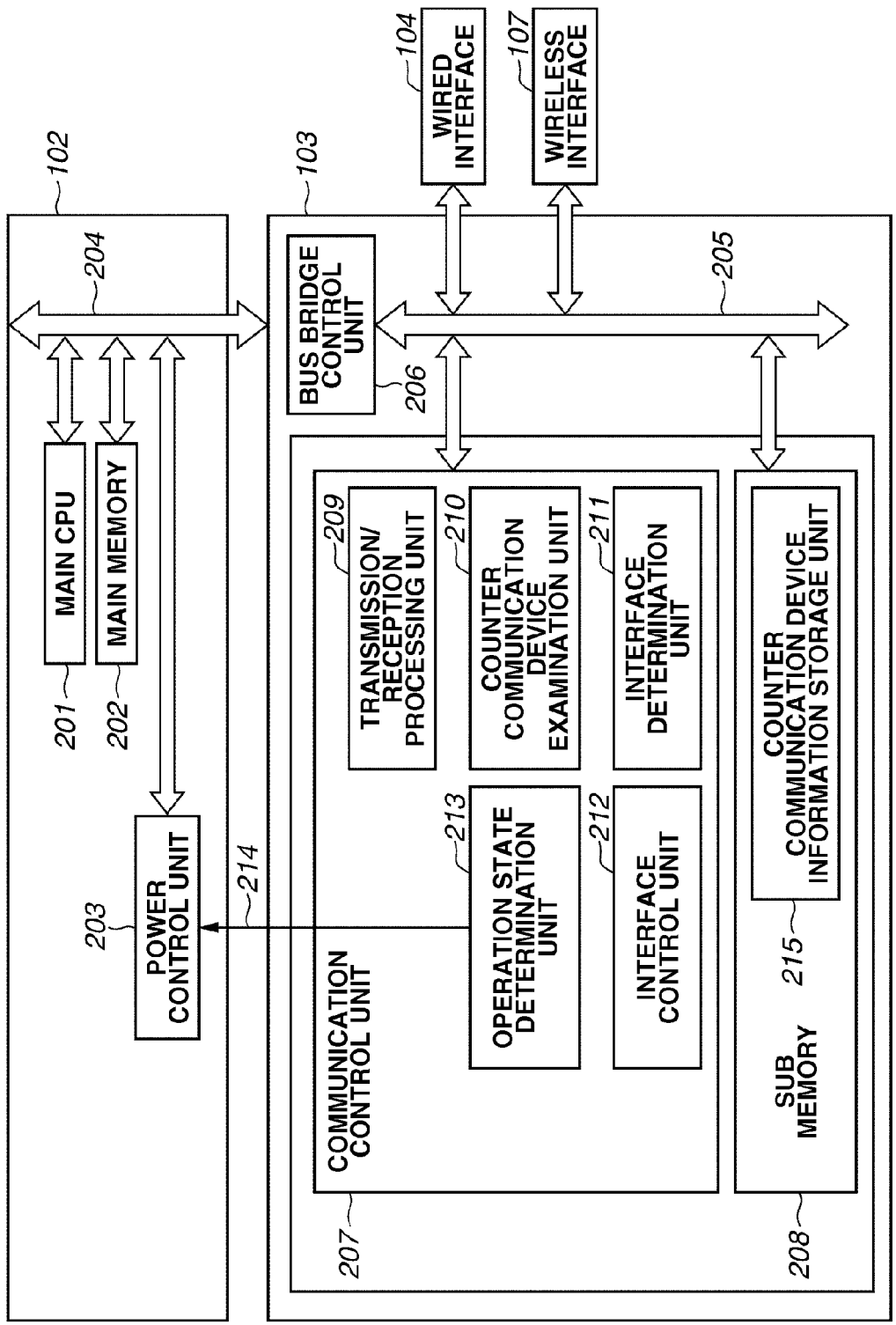
FIG. 2 illustrates a block configuration of a communication apparatus according to the exemplary embodiment of the present invention.

FIG. 2 illustrates an inner configuration of the communication apparatus 101.

The main processing unit 102 includes a main central processing unit (CPU) 201, a main memory 202, and a power control unit 203. The main CPU 201 executes an application for controlling the entire communication apparatus.

The main memory 202 includes a read only memory (ROM) and a random access memory (RAM). The main memory 202 stores a program executed by the main CPU 201 and various kinds of data handled thereby. As the main memory 202, in place of the ROM and the RAM, a storage medium may be used such as a flexible disk, a hard disk, an optical disk, an optical magnetic disk, a compact disk (CD)-ROM, a CD-recordable (R), a magnetic tape, a non-volatile memory card, and a digital versatile disk (DVD).

A power control unit 203 controls the power supply to each circuit of the main processing unit 102. The power control unit 203 stops or reduces the supply of a power source to each circuit of the main processing unit 102 so that the communication apparatus 101 can be switched to the normal state or the power-saving state.

The power control unit 203 stops or reduces the supply of the power source based on the power-saving state shift command from the main CPU 201. Further, when a normal-state shift request signal is notified by an operation state determination unit 213 via a signal line 214, the power control unit 203 resumes the supply of the power source to each block to which the supply of the power source has been stopped or reduced.

An interface control unit 212 described below stops or reduces the supply of the power source to the communication interface when the communication apparatus 101 is shifted to the power-saving state.

A main bus 204 is used by the main CPU 201 to access each function block. A local bus 205 is used by the communication processing unit 103 to access each function block. A bus bridge control unit 206 performs processing for connecting the main bus 204 with the local bus 205.

The communication processing unit 103 includes a communication control unit 207, a sub memory 208, the wired interface (cable socket in FIG. 1) 104, and the wireless interface (antenna in FIG. 1) 107. The communication control unit 207 controls the communication processing unit 103. The communication control unit 207 includes a transmission/reception processing unit 209, a connected apparatus examination unit 210, an interface determination unit 211, an interface control unit 212, and an operation state determination unit 213. The transmission/reception processing unit 209 performs transmission processing or reception processing on data.

The connected apparatus examination unit 210 examines compliance standards of the wired connected apparatus 106 and the wireless connected apparatus 109 connected with the communication apparatus 101. More specifically, the connected apparatus examination unit 210 determines whether the wired connected apparatus 106 and the wireless connected apparatus 109 comply with the power-saving function of each communication interface corresponding thereto.

If the wired connected apparatus 106 complies with IEEE802.3az, the wired connected apparatus 106 notifies the connected apparatus examination unit 210 of its compliance. The connected apparatus examination unit 210 confirms this notification to examine whether the connected apparatus has the power-saving function. More specifically, when the connected apparatus examination unit 210 receives this notification, it determines that the wired counter communication 106 device complies with IEEE802.3az, and when the connected apparatus examination unit 210 receives no notification, it is determined that the wired connected apparatus 106 does not comply therewith.

When the wireless connected apparatus 109 complies with PowerSave, the wireless connected apparatus 109 transmits a beacon including information indicating that the wireless connected apparatus 109 complies therewith. When the beacon includes the information indicating that the wireless connected apparatus 109 complies with PowerSave, the connected apparatus examination unit 210 determines that the wireless connected apparatus 109 complies therewith. On the other hand, when the beacon does not include the information indicating that the wireless connected apparatus 109 complies with PowerSave, the connected apparatus examination unit 210 determines that the wireless connected apparatus 109 does not comply therewith.

Further, the connected apparatus examination unit 210 determines whether the wired connected apparatus 106 and the wireless connected apparatus 109 have a function of responding by proxy (proxy response function) to a packet requesting a response from the communication apparatus 101. When the packet inquiring whether the wired connected apparatus 106 and the wireless connected apparatus 109 have the proxy response function is transmitted, and when the connected apparatus responds that it has the proxy response function, it is determined that the connected apparatus has the proxy response function.

Results of the above-described determination (herebelow, referred to as "examination results") are stored in a connected apparatus information storage unit 215 for each connected apparatus.

The proxy response function will be described herebelow. When the communication apparatus 101 in the power-saving state receives a predetermined inquiry that needs to be responded, the communication apparatus 101 needs to return from the power-saving state to the normal state to respond. For example, the communication apparatus 101 needs to respond to a name resolution request packet in an address resolution protocol (ARP) request packet or Universal Plug & Play (UPnP).

The proxy response function causes the connected apparatus to autonomously respond to the packet that needs to be responded by the communication apparatus 101 without forwarding the packet to the communication apparatus 101.

When the connected apparatus having the proxy response function receives the packet that needs to be responded by the communication apparatus 101, even though an address of the packet is the communication apparatus 101, the connected apparatus appropriately responds without forwarding the packet to the communication apparatus 101. With this arrangement, the communication apparatus 101 can further improve the power-saving effect since the communication apparatus 101 can maintain the power-saving state.

The interface determination unit 211 determines (i.e., selects) an communication interface to wait for the activation packet when the main processing unit 102 is in the power-saving state. More specifically, based on the connected apparatus information storage unit 215 in the sub memory 208, the communication interface to wait for the activation packet in the power-saving state is determined.

The communication interface determined herein is notified to the interface control unit 212. The processing for determining the waiting interface is performed when the communication processing unit 103 newly establishes (i.e., when the communication processing unit 103 newly, directly connects) a link connection with the connected apparatus or when the link connection that has been established is terminated (i.e., when the connection is directly terminated).

The interface control unit 212 individually controls the power supply to each communication interface included in the communication processing unit 103 to control the communication processing unit 103 to switch between the normal state and the power-saving state.

When the power-saving state shift command is notified by the operation state determination unit 213, the supply of the power source to the communication interfaces other than the waiting interface notified by the interface determination unit 211 is stopped. When the normal-state shift request signal is notified by the operation state determination unit 213, the supply of the power source to the communication interface to which the supply of the power source has been stopped is resumed.

The operation state determination unit 213 determines an operation state of the communication apparatus 101, and then notifies the power control unit 203 and the interface control unit 212 of the operation state thereof. For example, when the power-saving state shift command is received from the external apparatus 111 via the network 110, the power-saving state shift command is notified to the interface control unit 212.

Further, upon receiving the activation packet from the external apparatus 111, the operation state determination unit 213 outputs the normal-state shift request signal as a wake-up signal to the power control unit 203 and the interface control unit 212.

The operation state determination unit 213 notifies the power control unit 203 of the normal state shift request signal via the signal line 214.

The sub memory 208 includes a connected apparatus information storage unit 215, which stores the results of the examinations performed by the connected apparatus examination unit 210 for each connected apparatus.

The above-described inner configuration is just an example, and a plurality of function blocks may include one function block, or some function blocks may further include the plurality of function blocks.

Figure 3:
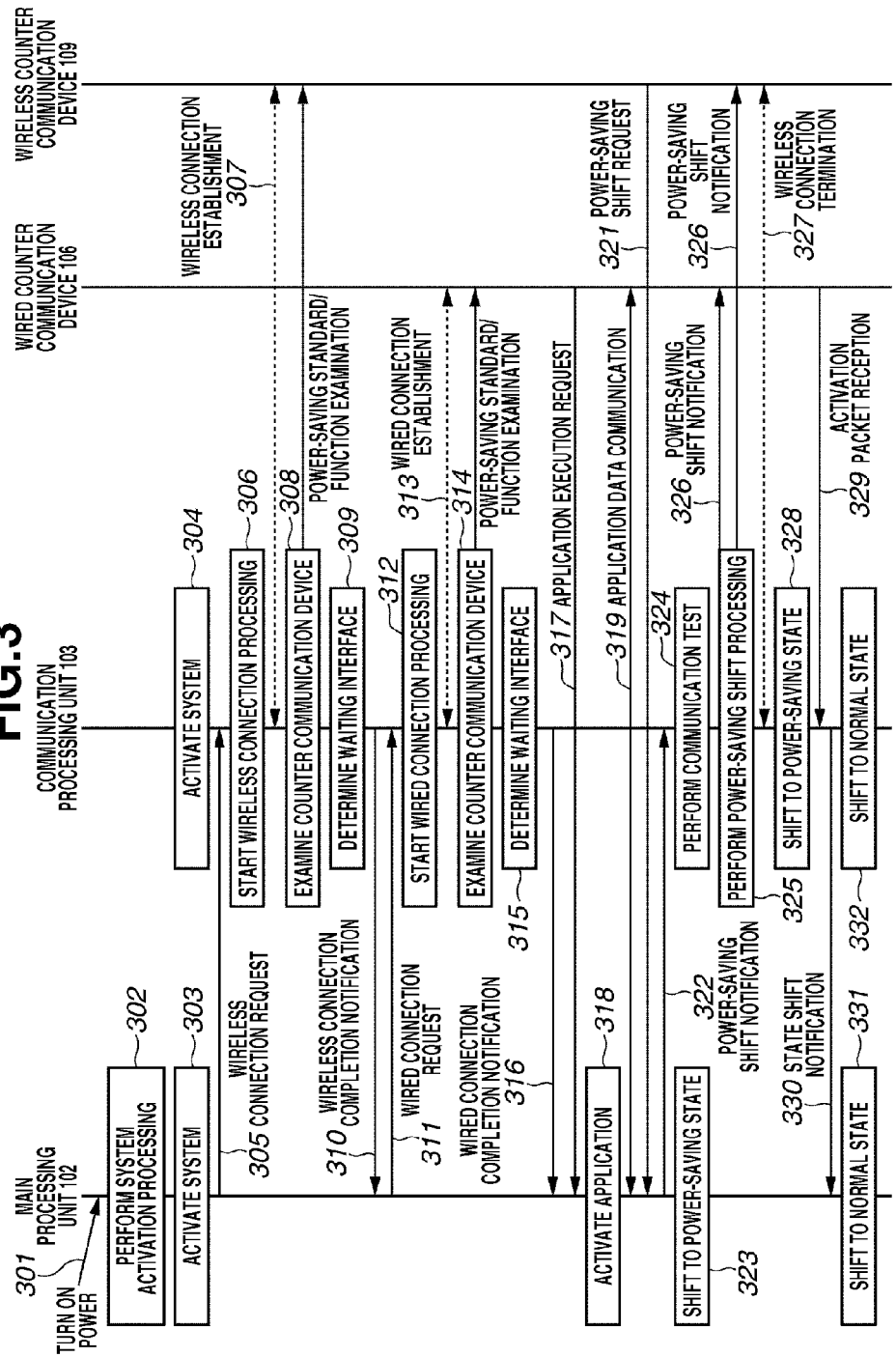
FIG. 3 illustrates a sequence of a main processing unit, a communication processing unit, and a connected apparatus.

With reference to FIG. 3, the present exemplary embodiment will be described herebelow.

An initial state illustrated in FIG. 3 is a state where a main power source of the main processing unit 102 is turned off. In step 301, a user operates a button to turn on the main power source, and in step 302, the main processing unit 102 activates a system. In steps 303 and 304, the system is activated together with both the main processing unit 102 and the communication processing unit 103 to be set to be in the normal state.

In step 305, the main processing unit 102 transmits a connection request to the communication processing unit 103 to establish communication connection with each connected apparatus. The connection request transmitted here is a wireless connection request for connecting with the wireless connected apparatus 109.

In step 306, according to the wireless connection request, the communication processing unit 103 starts processing for connecting with the wireless connected apparatus 109 via the wireless interface 107. In step 307, upon completion of direct connection (hereafter, referred to as "link connection") with the wireless connected apparatus 109, the communication processing unit 103 can communicate with the external apparatus 111 via the network 110 as illustrated in FIG. 1.

In step 308, upon completion of the link connection between the communication processing unit 103 and the wireless connected apparatus 109, the communication processing unit 103 starts the function examination on the wireless connected apparatus 109. It is determined whether the wireless connected apparatus 109 complies with the power-saving standard, and whether the wireless connected apparatus 109 has the proxy response function. The wireless connected apparatus 109 does not comply with the power-saving function herein. The examination results are stored in the connected apparatus information storage unit 215.

In step 309, upon completion of the function examination, based on the results of the function examinations and information stored in an interface selection condition storage unit (not illustrated in figures), the communication processing unit 103 determines the communication interface to wait for the activation packet in the power-saving state. At this stage, since only the wireless interface 107 of the interfaces capable of communication can communicate, the wireless interface 107 waits for the activation packet.

In step 310, upon completion of processing for determining the waiting interface, the communication processing unit 103 notifies the main processing unit 102 that the link connection with the wireless connected apparatus 109 has been established. In step 311, upon confirmation of the establishment of the link connection with the wireless connected apparatus 109, the main processing unit 102 transmits a wired connection request to the communication processing unit 103.

In step 312, the communication processing unit 103 starts processing for connecting with the wired connected apparatus 106 via the wired interface 104 according to the wired connection request. In step 313, upon establishment of the link connection between the communication processing unit 103 and the wired connected apparatus 106, in step 314, the communication processing unit 103 starts the function examination on the wired connected apparatus 106. The results of the function examinations are stored in the connected apparatus information storage unit 215. The wired connected apparatus 106 complies with the power-saving standard herein.

In step 315, upon completion of the function examination, the communication processing unit 103 performs processing for determining the waiting interface again. As the waiting interface determination processing, it is confirmed that the wired interface 104 and the wireless interface 107 are connected to the same network. It is confirmed by comparing network addresses (IP addresses) and subnet masks of the communication interfaces.

It may be also confirmed by conducting a communication test in which a packet is transmitted from one communication interface to another communication interface via the network.

When the wired interface 104 and the wireless interface 107 are not connected to the same network, both communication interfaces are determined as the communication interface to wait for the activation packet.

When the plurality of communication interfaces is connected to different networks, the packet from the external apparatus 111 is received via either one of the communication interfaces only, and not received via another communication interface. Accordingly, since only one communication interface cannot be sufficiently operated, both communication interfaces are determined as the communication interface to wait for the activation packet. With this arrangement, even when the communication processing unit 103 is connected to the plurality of network, the activation packet can be received without fail.

According to the present exemplary embodiment, since the wired interface 104 and the wireless interface 107 are connected to the same network, the interface determination unit 211 compares the function examination results for the connected apparatuses connected to each communication interface.

Based on the function examination results stored in the connected apparatus information storage unit 215, it is determined that the wired connected apparatus 106 complies with the power-saving standard and the wireless connected apparatus 109 does not comply therewith. Accordingly, the interface determination unit 211 determines the wired interface 104 as the waiting interface.

Upon completion of the processing for determining the waiting interface, in step 316, the communication processing unit 103 notifies the main processing unit 102 that the connection has been established.

Upon confirmation that connection with each connected apparatus has been established, in step 318, the main processing unit 102 activates an application for controlling the entire communication apparatus 101. In step 319, the data to be used by the application is transmitted/received between the main processing unit 102 and the wired connected apparatus 106.

The application data is transmitted/received between the external apparatus 111 and the main processing unit 102 illustrated in FIG. 1. For example, when the communication apparatus 101 is a printer and receives an instruction from the external apparatus 111 to perform a print job, image data or an error notification is transmitted/received.

In step 321, the main processing unit 102 receives a power-saving shift request from the external apparatus 111 via the wireless connected apparatus 109, in step 322, the main processing unit 102 transmits a power-saving shift notification to the communication processing unit 103, and then in step 323, the main processing unit 102 shifts to the power-saving state.

Upon reception of the power-saving state notification, in step 324, the communication processing unit 103 conducts the communication test using the communication interface to wait for the activation packet to confirm that the communication processing unit 103 can communicate with the external apparatus 111 that has transmitted the power-saving shift request. A test packet is transmitted to the external apparatus 111 via the communication interface to wait for the activation packet, to confirm whether the external apparatus 111 responds to the transmitted test packet.

When the communication interface that has received the power-saving shift notification is the same as the waiting interface, the above-described test is not conducted. Without conducting the test, since the test packet does not need to be transmitted, communication workload of the network 110 is not increased accordingly.

As a result of the communication test, when the communication cannot be performed, the communication interface that has received the power-saving shift notification is determined as the waiting interface. With this arrangement, a possibility of failure of receiving the activation packet can be reduced.

After the communication test finishes, in step 325, the power-saving shift processing starts. In step 326, the power-saving shift notification is transmitted to the wired connected apparatus 106 and the wireless connected apparatus 109, and then stop processing of the wireless interface 107 is performed. The saving-power shift notification includes information (MAC address of the wired interface 104) necessary for generating the activation packet.

When the power-saving shift request is received from the communication interface different from the waiting interface, it is notified to the external apparatus 111, which has transmitted the saving-power shift request, and its user that the communication interface to wait for the activation packet is different from the interface that has received the power-saving shift request.

Upon completion of power-saving shift processing 325, in step 327, connection via the communication interface that has not been selected (herein, wireless connection) is terminated. In step 328, the communication processing unit 103 shifts to the power-saving state according to the power-saving standard with which the wired connected apparatus 106 complies. After the communication processing unit 103 shifts to the power-saving state, it waits for the activation packet.

Subsequently, in step 329, the activation packet for canceling the power-saving state of the communication apparatus 101 is received via the wired connected apparatus 106. Upon reception of the activation packet, in step 330, the operation state determination unit 213 notifies the main processing unit 102 of the normal-state shift request signal via the signal line 214, and in step 331, the main processing unit 102 returns to the normal state. Further, in step 332, the communication processing unit 103 similarly shifts to the normal state.

Figure 4:
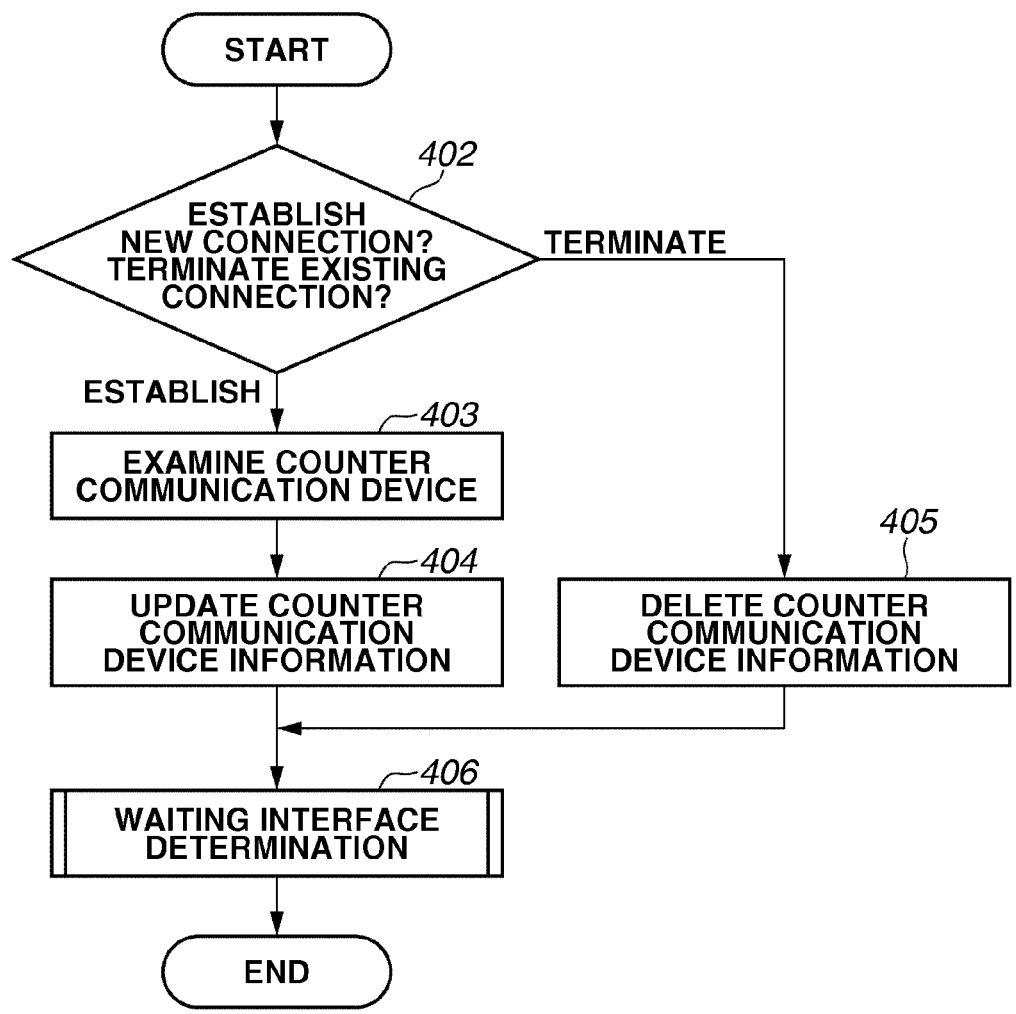
FIG. 4 is a flowchart illustrating a waiting interface selection operation performed by the communication processing unit.

FIG. 4 illustrates a flowchart when the information processing unit 103 determines the communication interface to wait for the activation packet.

The flowchart can be realized when the main CPU 201 reads and executes a program stored in the main memory 202. Further, the flowchart corresponds to the processing performed in steps 308 and 309 or in steps 314 and 315 illustrated in FIG. 3.

In step 402, the communication processing unit 103 determines whether the link connection has been newly established or whether the connection of the communication interface to wait for the activation packet (existing connection) has been terminated. When the link connection has been newly established, the processing proceeds to step 403. When the existing connection has been terminated, the processing proceeds to step 405.

When the link connection has been newly established, then in step 403, the examinations are conducted on the power-saving standard with which the connected apparatus that has newly established the link connection complies and the proxy response function. In step 404, the examination results are stored in the connected apparatus information storage unit 215.

On the other hand, when the existing connection is terminated, then in step 405, the examination results of the terminated connected apparatus are deleted. Subsequently, in step 406, the interface determination unit 211 determines the communication interface to wait for the activation packet (hereafter, referred to as a "waiting interface") based on the examination results.

Figure 5:
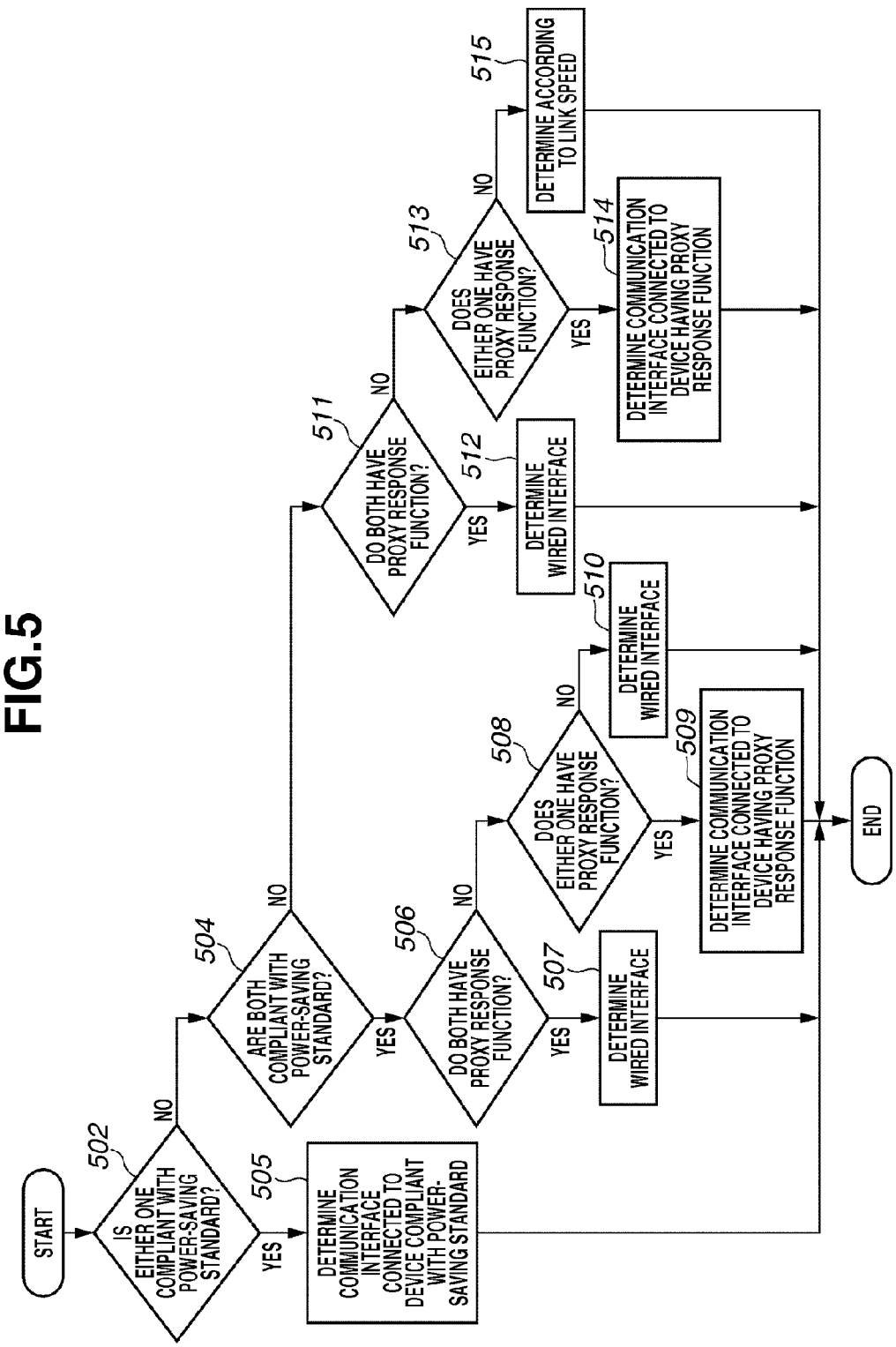
FIG. 5 is a flowchart illustrating processing for comparing connected apparatuses with each other in an interface determination unit.

FIG. 5 illustrates a flowchart for determining the waiting interface that is performed by the interface determination unit 211 in step 406.

In steps 502 and 504, the interface determination unit 211 determines whether the wired connected apparatus 106 and the wireless connected apparatus 109 comply with the power-saving standard. When either one of the connected apparatuses complies with the power-saving standard (YES in step 502), the processing proceeds to step 505, while both of the connected apparatuses comply with the power-saving standard (YES in step 504), the processing proceeds to step 506. When none of them complies with the power-saving state (NO in step 504), the processing proceeds to step 511.

When only one of the connected apparatuses complies with the power-saving standard (YES in step 502), then in step 505, the communication interface link-connected with the connected apparatus complying with the power-saving standard is determined as the waiting interface.

On the other hand, when both of the connected apparatuses comply with the power-saving state (YES in step 504), then in steps 506 and 508, it is determined whether the above-described connected apparatuses have the proxy response function. When both connected apparatuses have the proxy response function (YES in step 506), the processing proceeds to step 507, and when either one of the connected apparatuses has the proxy response function (YES in step 508), the processing proceeds to step 509. When none of the connected apparatuses has the proxy response function (NO in step 508), the processing proceeds to step 510.

When both connected apparatuses have the proxy response function (YES in step 506), then in step 507, the wired interface 104 is determined as the waiting interface. With this arrangement, the power-saving effect can be further increased rather than when the wireless interface is selected.

When either one of the connected apparatuses has the proxy response function (YES in step 508), then in step 509, the communication interface link-connected with the connected apparatus having the proxy response function is determined as the waiting interface.

Further, when none of the connected apparatuses includes the proxy response function (NO in step 508), then in step 510, the wired interface 104 is determined as the waiting interface.

Processing in step 511 same as in step 506, processing in step 512 same as in step 507, processing in step 513 same as in step 508, and processing in step 514 same as in step 509 are performed, and thus not repeatedly described.

In step 515, the waiting interface is determined according to a link speed (communication speed according to the standard) of the wired connected apparatus. In step 515, none of the wired connected apparatus 106 and the wireless connected apparatus 109 complies with the power-saving standard and has the proxy response function.

The larger a link band to which the wired interface 104 is connected is, the more amount of the power the wired interface 104 consumes. For example, when the wired interface 104 complies with IEEE802.3, the wired interface is selected for 100BASE-T connection, and the wireless interface is selected for 1000BASE-T connection. Thus, the communication interface consuming the less power can be selected.

As described above, according to the power-saving standard and the proxy response function mounted in the connected apparatus with which the communication apparatus 101 is connected, the activation packet can be waited in a state where a least power is consumed. Further, since the user does not need to select the communication interface for receiving the activation packet, user's workload can be reduced.

According to the above-described exemplary embodiment, when both connected apparatuses have the proxy response function (YES in steps 506 and 511), the wired interface is selected as the waiting interface. However, the waiting interface may be selected depending on the proxy response function which each connected apparatus has.

For example, one of the connected apparatuses has the proxy response function for a first communication protocol used when the communication apparatus 101 communicates, and another connected apparatus has the proxy response function for a second communication protocol that is not used when the communication apparatus 101 communicates. In such a case, the communication interface link-connected with the connected apparatus that has the proxy response function for the first communication protocol is preferentially selected as the waiting interface.

With this arrangement, based on which communication protocol the proxy response function complies with, the waiting interface can be selected. Accordingly, the communication interface can be further appropriately selected for power-saving.

Further, since many access points complying with the current IEEE802.11 series comply with the power-saving standard, it may be accepted that the wireless connected apparatus complies with the power-saving standard without determining whether the wireless connected apparatus complies therewith. With this arrangement, since the determination on the wireless connected apparatus may be omitted, the processing load can be further reduced.

Furthermore, as described above, a combination of the wired interface and the wireless interface is described as an example, however, a plurality of wireless interfaces corresponding to different wireless communication methods may be used. For example, one of the wireless interfaces may comply with a wireless LAN, and another may comply with Bluetooth. Even in such an exemplary embodiment, similarly, the communication interface consuming the less power can be selected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-220307 filed Oct. 4, 2011, which is hereby incorporated by reference herein in its entirety.

What is claimed is:

1. A communication apparatus capable of communicating with a first apparatus via a first communication interface and communicating with a second apparatus via a second communication interface, the communication apparatus comprising:
a first determination unit configured to determine whether the first apparatus complies with a power-saving function of the first communication interface; and
a selection unit configured to select a first communication interface to be operated when the communication apparatus is set to be in a power-saving state in a case where the first determination unit determines that the first apparatus complies with the power-saving function of the first communication interface, and to select a second communication interface to be operated when the communication apparatus is set to be in a power-saving state in a case where the first determination unit determines that the first apparatus does not comply with the power-saving function of the first communication interface.

2. The communication apparatus according to claim 1, further comprising a stopping unit configured to stop power supply to the communication interface that is not selected by the selection unit.

3. The communication apparatus according to claim 1, further comprising a canceling unit configured to cancel the power-saving state of the communication apparatus by receiving a predetermined packet for canceling the power-saving state of the communication apparatus via the communication interface selected by the selection unit.

4. The communication apparatus according to claim 1, further comprising a confirmation unit configured to confirm that the first apparatus and the second apparatus are connected to the same network,
wherein the selection unit performs selection when the confirmation unit confirms that the first apparatus and the second apparatus are connected to the same network.

5. The communication apparatus according to claim 1, further comprising a second determination unit configured to determine whether the second apparatus complies with a power-saving function of the second communication interface,
wherein the selection unit selects a communication interface based on the determination result acquired by the first determination unit and a determination result acquired by the second determination unit.

6. The communication apparatus according to claim 5, further comprising a third determination unit configured to determine whether each of the first and the second apparatuses has a function in which the apparatus responds to a packet transmitted to the communication apparatus via a network without forwarding the packet to the communication apparatus,
wherein the selection unit selects a communication interface based on the determination result acquired by the first determination unit, the determination result acquired by the second determination unit, and a determination result acquired by the third determination unit.

7. The communication apparatus according to claim 1, wherein, when either one of the first and the second apparatuses is connected to the communication apparatus, the selection unit selects a communication interface communicating with the connected apparatus.

8. The communication apparatus according to claim 1, further comprising:
a reception unit configured to receive a notification for setting the communication apparatus to be in a power-saving state from another communication apparatus; and
a control unit configured to, when the reception unit receives the notification, set the communication apparatus to be in the power-saving state.

9. The communication apparatus according to claim 8, further comprising a notification unit configured to notify the another communication apparatus of information about the communication interface selected by the selection unit.

10. The communication apparatus according to claim 9,
wherein, when the communication interface that has received the notification is different from the communication interface selected by the selection unit, the notification unit performs notification, and
wherein, when the communication interface that has received the notification is the same as the communication interface selected by the selection unit, the notification unit does not perform notification.

11. A control method performed in a communication apparatus capable of communicating with a first apparatus via a first communication interface and communicating with a second apparatus via a second communication interface, the method comprising:
via a first determination unit, determining whether the first apparatus complies with a power-saving function of the first communication interface; and
via a selection unit, selecting a first communication interface to be operated when the communication apparatus is set to be in a power-saving state in a case where the first determination unit determines that the first apparatus complies with the power-saving function of the first communication interface, and to select a second communication interface to be operated when the communication apparatus is set to be in a power-saving state in a case where the first determination unit determines that the first apparatus does not comply with the power-saving function of the first communication interface.

12. A non-transitory computer-readable medium having stored thereon a program for performing a method according to claim 11.

* * * * *